June 18, 1929.　　　G. W. COCKS　　　1,717,435
CHECK BOOK
Filed June 4, 1926　　2 Sheets-Sheet 1
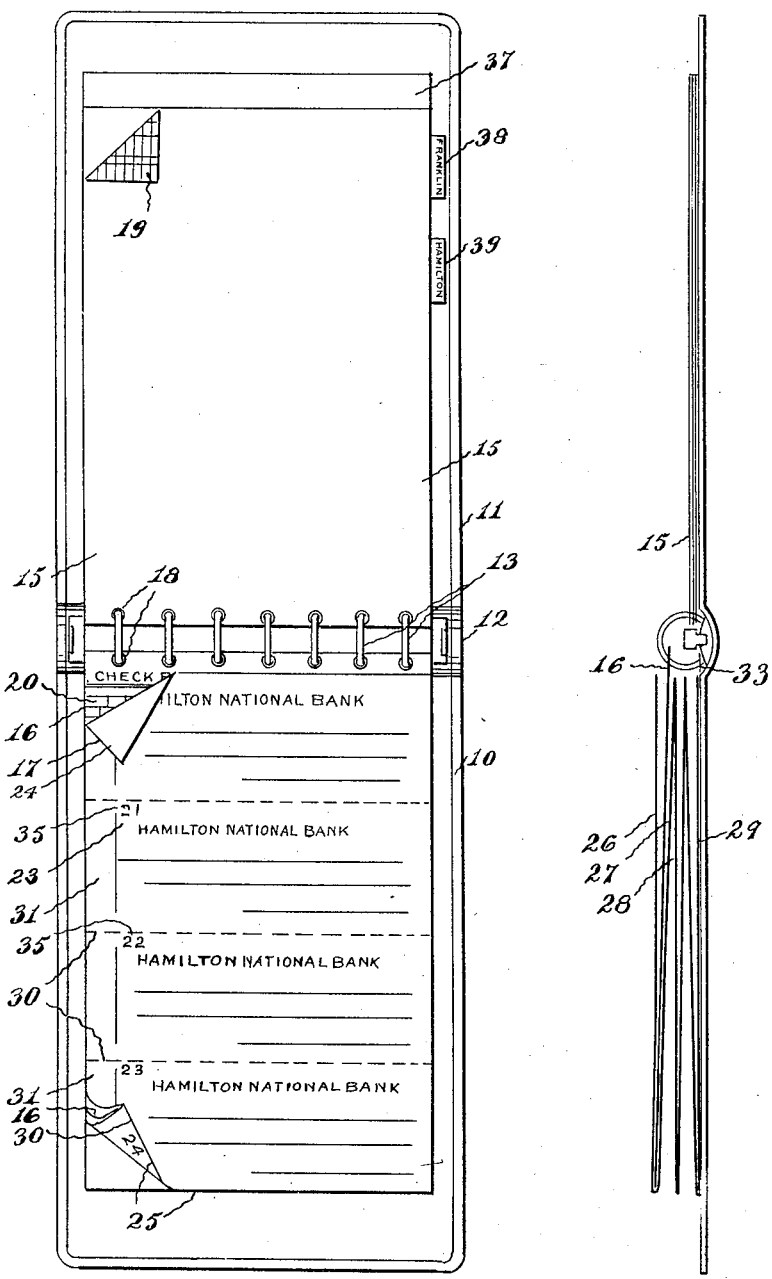
INVENTOR
George W. Cocks,
BY
Harold D. Penny ATTORNEY June 18, 1929.  G. W. COCKS  1,717,435
CHECK BOOK
Filed June 4, 1926  2 Sheets-Sheet 2
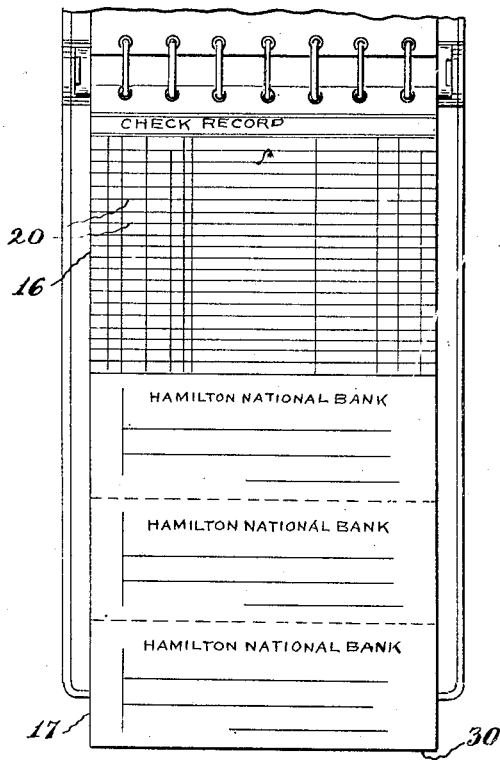
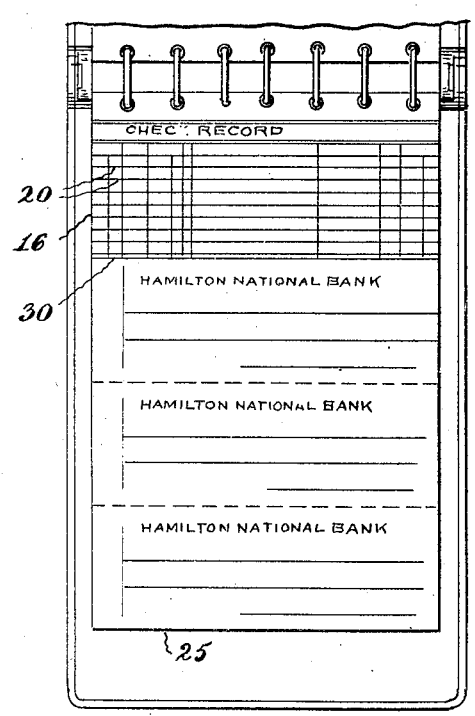
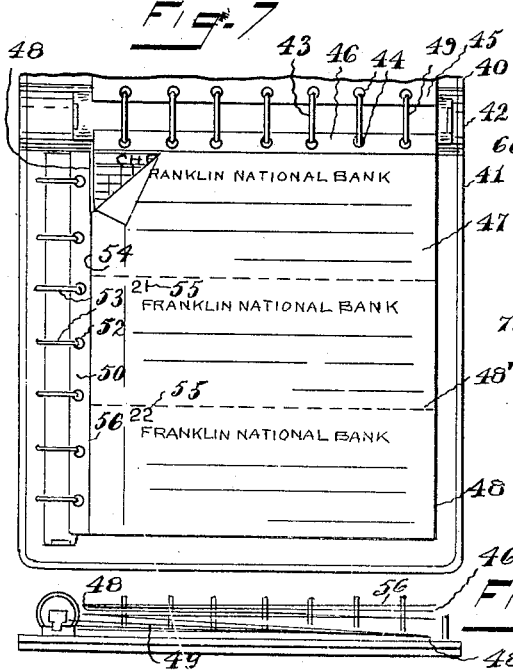
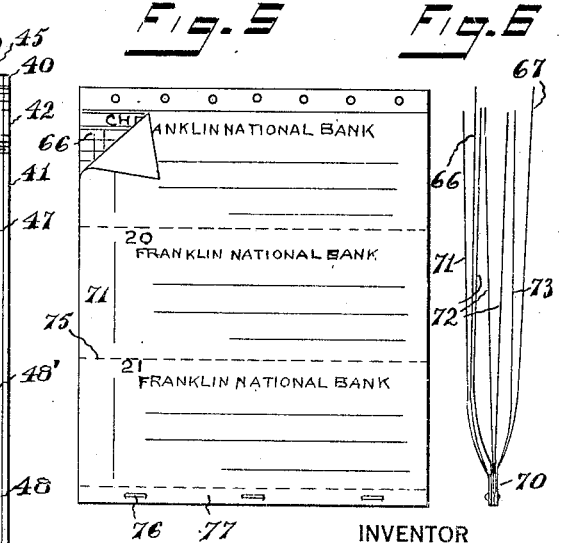
INVENTOR
George W. Cocks,
BY
Harold O. Penney, ATTORNEY Patented June 18, 1929.

1,717,435

UNITED STATES PATENT OFFICE.

GEORGE W. COCKS, OF MANASQUAN, NEW JERSEY.

CHECK BOOK.

Application filed June 4, 1926. Serial No. 113,679.

This invention relates to check books and more particularly to check books having deposit and check record pages and a large number of check blanks all in the same binding.

One object of the invention is to provide a book of this kind having a full check record page and a check blank sheet comprising a plurality of check blanks easily disposable on the record page for convenient check writing.

Another object of the invention is to provide easily manufactured check blank sheets of this kind each comprising a large number of check blanks.

Another object of the invention is to provide improved sheets of this kind which are particularly suitable for loose leaf binders and for keeping a large number of records and records of different banks all in the same binder.

Other objects of the invention are to improve generally the simplicity and efficiency of such books and to provide an arrangement of this kind which is economical, and convenient in use, and economical to manufacture.

Still other objects of the invention will appear as the description proceeds; and while herein details of the invention are described and claimed, the invention is not limited to these, since many and various changes may be made therein without departing from the scope of the invention as claimed in the broader claims.

The inventive features for the accomplishment of these and other objects are shown herein in connection with improved check books each of which, briefly stated, includes sets of leaves therein, each set including a check record sheet secured at one edge and a lower sheet beneath the record sheet and carrying a set of superposed registering check blank sections carried by the free edge of said lower sheet and divided by transverse lines into check blanks, said lower sheet extending at said free edge beyond said record page, whereby the uppermost of said sections may lie flat over the record page. The check blanks have printed thereon horizontally arranged checks having serial numbers in numerical order throughout, the smallest serial number being always on the uppermost edge check of the section, said check being disposable flat over the check record page in convenient position relative to the record page for the next check to be written.

In the accompanying drawing, showing by way of example, several of many possible embodiments of the invention, Fig. 1 is a plan showing one form of my check book open;

Fig. 2 is a side elevation showing the book as in Fig. 1;

Fig. 3 is a fragmental plan showing said book with the check blank sheet in a different position;

Fig. 4 is a fragmental plan showing the sheet after a check blank has been removed;

Figs. 5 and 6 are respectively plan and side elevation of another form of check record and check blank sheet;

Fig. 7 is a fragmental plan showing another form of the check book; and

Fig. 8 is a front elevation showing the book of Fig. 7.

The sheets of my check book as shown in Fig. 1 are suitably carried in an elongated binder including a pair of elongated covers 10, 11 and a hinge portion 12 joining said covers at shorter edges thereof and carrying a set of openable binder rings 13, though it is noted that the invention is not limited to loose leaf binders.

Sets of sheets 15, 16, 17 in said binder have ring perforations 18 at the upper edge received on said rings 13 and each set includes a deposit record sheet 15 and a check record sheet 16 under the deposit record sheet and respectively having deposit-record and check-record rulings 19 and 20 disposed face up when the sheet is turned toward the user.

Each set also includes a check blank sheet 17 in part beneath the deposit page having a printed face 23 and a blank face 24 and provided with transverse fold lines 25 whereby the sheet is divided into a large even number of sections 26, 27, 28, 29 adjacent sections being folded face to face upon themselves and superposed and each divided by transverse weakened lines 30 into check blanks 31, the end weakened lines of each section coinciding with said fold lines 25.

The lowest section 29 has at its upper edge a tab extension 33 separated from the adjacent check blank by a weakened line and is slightly longer than said check record sheet 16, whereby the uppermost section 26 may be folded flat over and approximately cover the check record page, as in Fig. 1 or be in position to be slipped down on the check record page and folded on the weakened line 30 next above the fold, as in Fig. 3, to expose the check record page when writing the first check of the check blank sheet. After the first check is torn off the parts may be disposed as in Fig. 4.

The check blanks have the checks printed thereon in a series of horizontally arranged checks having serial numbers 35 in numerical order throughout the whole printed face, the smallest serial number being always on the free edge check of the sheet in convenient position for the next check to be written, the succeeding numbers increasing down on the uppermost section and up on the lowest section 19.

The checks on the alternate sections including the uppermost section 26 being face up and right side up, the checks on alternate sections including the lowest section 29 being face down, whereby when the uppermost section is exhausted the lowest check on the adjacent intermediate section 27 may be slipped down and folded over the check record sheet conveniently beneath the record of such check and be written upon, and the free edge checks on the lowest section 29 may be folded over upon the next check above of the same section and be written upon.

A large number of sets of sheets of each kind may be carried in the binder; and accounts of several different banks may be carried in the same binder, the sheets thereof being separated by means of index sheets 37 carrying index tabs 38, 39.

The form of check book shown in Figs. 7 and 8 comprises a binder including a pair of upper and lower covers 40 and 41 and a hinge portion 42 joining said covers at the inner edges and carrying upper binder rings 43 on which are received perforations 44 of the deposit record sheet 45, and the check record sheet 46 disposed face up under the deposit record sheet. In this form of the invention the check blank sheet 47 is provided with longitudinal weakened fold lines 48 whereby the sheet is divided into a number of sections, adjacent sections being face to face upon themselves and each divided into check blanks by transverse weakened lines 48′ meeting the fold lines. The lowest section 49 has along one side edge a tab extension 50 having perforations 52 received on a set of marginal rings 53 and is separated from the adjacent check blank by a weakened line 54.

Said lowest section 49 projects at its free edge as far as the record sheet, whereby the uppermost section 56 may lie flat over and approximately cover the check record page and any free end section may be moved to disposition over the check record page.

Said check blanks have serial numbers 55, the smallest number always being on the upper edge check of the section, the checks on all sections being right side up. Alternate section including the uppermost section 56 being face up and the other sections including the lowest section 49 being normally face down.

The sheets shown in Figs. 5 and 6 are for use with a binder such as in Fig. 1 including a pair of upper and lower covers and a hinge portion joining said covers at the upper edges and carrying upper binder rings on which are received sets of check record sheets 66, 67 disposed on said rings, one above the other, the lower check record sheets 67 extending at the lower edge beyond the upper check record sheet to form an extending edge 70 to which is secured a large number of superposed registering check blank sheets 71, 72, 73 or sections, each divided into check blanks by transverse weakened lines 75. Wire staples 76 secure the lower edge portions 77 of said sections together and on said extending edge 70.

Since said lower edge portions 77 extend beyond the lower edge of the upper record sheet, the uppermost check blank section 71 may lie flat over and approximately cover the upper check record page. Said check blanks have serial numbers, the smallest number always being on the upper edge check of the section; and the checks on all sections are right side up and face up.

When the blanks of the upper section 71 are used up, the uppermost section 72 may be placed over the sheet 66. The lower sheet 67 may be used for recording some of the checks of the blanks carried thereby, or it may be used to record checks of blanks carried by the next check record sheet thereunder.

I claim as my invention:

1. A check book including sets of leaves; each set including a check record sheet secured at one of its edges to the check book, a lower sheet beneath the record sheet and secured at an edge of the book; and superposed registering check blank sections secured to the free edge of said lower sheet and divided by transverse lines into check blanks, each section being free of folds between its edges.

2. A check book including sets of leaves; each set including a check record sheet secured at one of its edges to the check book; a lower sheet beneath the record sheet and secured at an edge of the book; and superposed registering check blank sections secured to the free edge of said lower sheet and divided by transverse lines into check blanks; said lower sheet extending at its free edge beyond said record page, whereby the uppermost of said sections may lie flat over the record page, each section being free of folds between its edges.

3. A check book including sets of leaves; each set including a check record sheet secured at one of its edges to the check book; and having horizontal entry lines; a lower sheet beneath the record sheet and secured at an edge of the book; and superposed registering check blank sections secured to the free edge of said lower sheet and divided by transverse lines into check blanks; said lower sheet extending at its free edge beyond said record page, whereby the uppermost of said sections may lie flat over the record page; said check blanks having printed thereon a series of horizontally arranged checks having serial numbers in numerical order throughout the whole printed face, the smallest serial number being always on the uppermost edge check of the section disposable flat over the check record page in convenient position for the next check to be written.

4. A check book including sets of leaves; each set including a check record sheet secured at one of its edges to the check book and a long check blank sheet a part thereof being beneath the record sheet and having a printed face and weakened lines whereby the sheet is divided into horizontal check sections and a tab extension secured at an edge of the book, adjacent sections being folded face to face and divided by transverse lines into check blanks; said lowest section extending at its free edge beyond said record page, whereby the uppermost section may lie flat over the record page, each section being free of folds between its edges.

5. An elongated check book including a hinge portion at the shorter edge; sets of leaves secured in said binder at said edge; each set including a check record sheet; and a check blank sheet a part thereof being beneath the record sheet and having a printed face and transverse fold lines whereby the sheet is divided into sections registering with each other at their lower edges, adjacent sections being folded face to face and divided by transverse weakened lines into check blanks; said lowest section being longer than said record page, whereby the uppermost section may lie flat over the record page; said check blanks having serial numbers, the smallest number being always on the free edge check of the sheet; the checks on alternate sections including the lowest section being face down.

6. An elongated check book including a hinge portion at the shorter edge carrying rings; sets of leaves secured on said rings; each set including a deposit page and a check record sheet, and a check blank sheet a part thereof being beneath the record sheet and having a printed face and transverse fold lines whereby the sheet is divided into sections registering with each other at their lower edges, adjacent sections being folded face to face and divided by transverse weakened lines into check blanks, said lowest section being longer than said record page, whereby the uppermost section may lie flat over the record page, said check blanks having printed thereon a series of horizontally arranged checks having serial numbers in numerical order throughout the whole printed face, the smallest serial number being always on the free edge check of the leaf in the obvious position for the next check to be written, with the succeeding numbers increasing down on the uppermost section and up on the lowest section, the checks on the alternate sections including the uppermost section being face up, the checks on alternate sections including the lowest section being face down.

7. A check book comprising an elongated binder including a pair of elongated covers and a hinge portion joining said covers at shorter edges thereof and carrying a set of openable binder rings; sets of leaves in said binder having ring perforations at the upper edge received on said rings, each set including a deposit record page; a check record page under the deposit record page and having check-record rulings thereon disposed face up when the page is turned toward the user; and a check blank sheet a part thereof being beneath the deposit page and having a printed face and a blank face and provided with transverse fold lines whereby the sheet is divided into a large even number of sections, adjacent sections being folded face to face upon themselves and superposed and each divided by transverse weakened lines into four check blanks; the lowest section having at its upper edge a tab extension separated from the adjacent check blank by a weakened line and being longer than said record page and secured to an edge of the book.

8. A check book including a check record sheet secured at one of its edges to an edge of the book; a lower sheet beneath the record sheet and secured at an edge of the book; and superposed check blank sections secured to a free edge of said lower sheet and divided into check blanks, each section being free of folds between its edges.

9. A check book including a check record sheet secured at one of its edges to an edge of the book; a lower sheet beneath the record sheet and secured at an edge of the book; and superposed registering check blank sections secured to the free edge of said lower sheet and divided by transverse lines into check blanks, each section being free of folds between its edges.

10. A check book comprising sets of leaves, each set including a deposit record sheet, and a check record sheet under the deposit record sheet, both having horizontal record-entry lines thereon disposed face up when the sheet is turned toward the user; and a check blank sheet a part thereof being beneath the deposit page and provided with transverse fold lines whereby the sheet is divided into a large number of sections, one section being on the top face of the check record sheet, the others being covered by the check record sheet, adjacent sections being folded face to face upon themselves and superposed and each divided by horizontal transverse weakened lines into a plurality of horizontally disposed check blanks, the outer and weakened lines of said sections coinciding with said fold lines; the lowest section being longer than said check record sheet whereby any uppermost section may be folded flat over and approximately cover the check record page, or be slipped down on the check record page and folded on a weakened line to expose the check record page and to dispose the check being written in immediate proximity to and parallel to the corresponding entry line to expose the check entry and to dispose the check parallel to, and right side up relative to, the corresponding entry line and immediately adjacent thereto, to facilitate copying.

11. A check book comprising sets of leaves, each set including a deposit record sheet, and a check record sheet under the deposit record sheet, both secured to the same edge of the check book and having horizontal record-entry lines thereon disposed face up when the page is turned toward the user; a bottom section secured at said edge under the deposit page; and check blank sections joining said bottom section, one section being on top of the check record sheet the others being covered by the check record sheet, said sections being divided by horizontal transverse weakened lines into a plurality of horizontally disposed check blanks; said bottom section being longer than said check record sheet whereby any uppermost section may be folded flat over and approximately cover the check record page, or may be slipped down on the check record page and folded on a weakened line to expose the check record page and to dispose the check being written in immediate proximity to and parallel to the corresponding entry line.

12. A check book comprising sets of leaves, each set including a deposit record sheet, and a check record sheet under the deposit record sheet, both having horizontal record-entry rulings thereon disposed face up when the page is turned toward the user; and a check blank sheet a part thereof being beneath the deposit page and having a printed face and a blank face and provided with fold lines whereby the sheet is divided into a large even number of sections, one section being on top of the check record sheet the others covered by the check record sheet, adjacent sections being folded face to face upon themselves and superposed and each divided by horizontal transverse weakened lines into a plurality of horizontally disposed check blanks; the lowest section extending beyond, said check record page whereby any uppermost section may be folded flat over and in part cover the check record page, to dispose the check blanks parallel to, and right side up relative to, the corresponding entry lines to facilitate copying.

Signed at New York in the county of New York and State of New York this 20th day of May A. D. 1926.

GEORGE W. COCKS.